Figure 1:
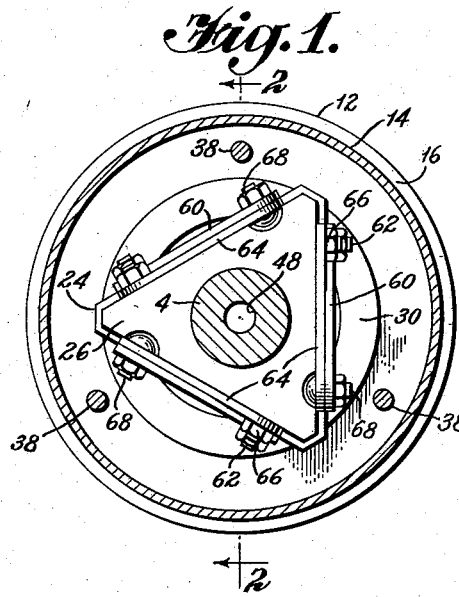

Sept. 27, 1955  G. W. STEINBRUEGGE ET AL  2,718,782
TORQUE INDICATOR

Filed April 1, 1953  3 Sheets-Sheet 1

INVENTORS
GEORGE W. STEINBRUEGGE,
XZIN McNEAL AND
WESLEY F. BUCHELE

BY
Bacon & Thomas
ATTORNEYS

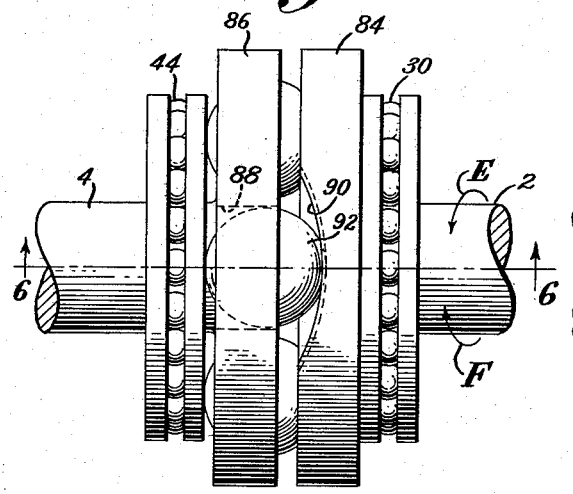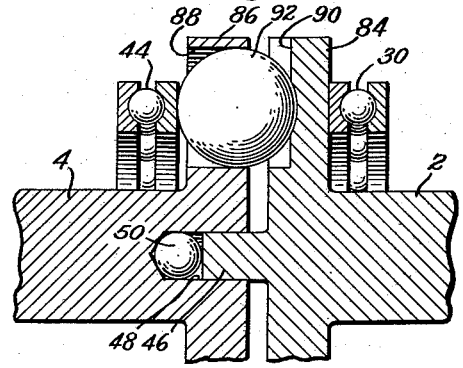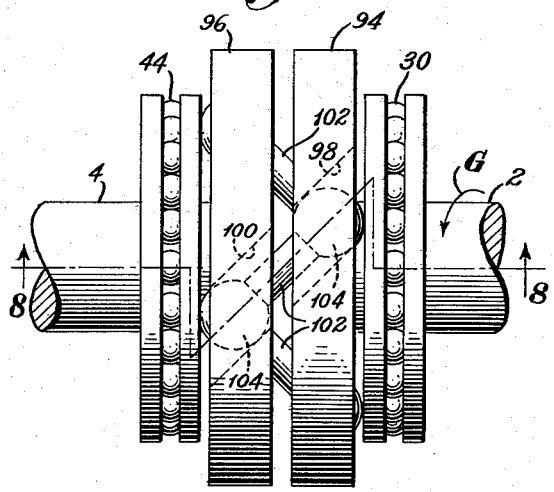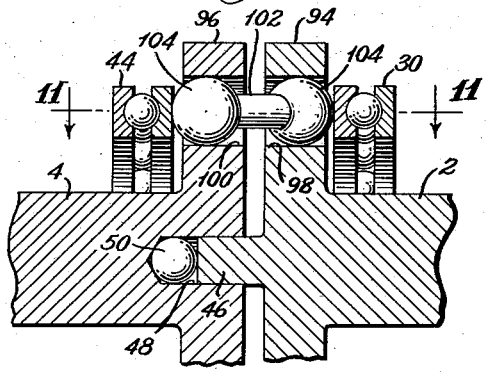

Sept. 27, 1955  G. W. STEINBRUEGGE ET AL  2,718,782
TORQUE INDICATOR
Filed April 1, 1953  3 Sheets-Sheet 3

INVENTORS
GEORGE W. STEINBRUEGGE,
XZIN M<sup>c</sup> NEAL AND
WESLEY F. BUCHELE
BY
Bacon & Thomas
ATTORNEYS United States Patent Office 2,718,782
Patented Sept. 27, 1955

2,718,782

TORQUE INDICATOR

George W. Steinbruegge and Xzin McNeal, Fayetteville, Ark., and Wesley F. Buchele, Ames, Iowa Application April 1, 1953, Serial No. 346,244

2 Claims. (Cl. 73—136)

This invention relates to torque indicators adapted to indicate the torque being transmitted from one shaft to another and to indicate variations in the torque as they occur. The present invention relates particularly to a torque indicator wherein the driving and driven shafts do not move axially relative to each other during torque transmission and indicating functions of the apparatus.

In general the invention includes a pair of shafts arranged in end to end relation and rotatably mounted in a fixed frame. The shafts are held against relative axial movement and are provided with means at their adjacent ends to transmit torque from one to the other. In general the means comprise an element for transmitting a partially tangential and partially axial force in an oblique direction, the means for so transmitting the torque engaged shoulders or other structure rigidly fixed on the respective shafts for receiving the tangential component of the force and converting it to torque on the driven shaft. The force transmitting means are so arranged as to be axially movable with respect to at least one shaft and in response to the axial component so that axial movement may be detected and the force causing such movement may be measured as an indication of the torque. The means for resisting axial movement of the force transmitting means comprises generally a thust bearing mounted on the frame in position to receive the axial thrust, permitting the member to rotate with the shafts and relative to the frame. The thrust bearing preferably engages a diaphragm overlying a recess on the frame structure and contains a suitable liquid. Thrusts on the bearing thus tend to compress the liquid and a pressure indicator is employed to indicate the pressure in the body of liquid as a measure of the torque. The arrangement contemplated is particularly advantageous in that it enables the employment of a hydraulic pressure measuring system without the necessity of causing rotation of the hydraulic fluid. Prior art systems for measuring torque by the use of a hydraulic apparatus cause the fluid to rotate with the shafts and under such circumstances, centrifugal force acting on the fluid causes an erroneous indication since the pressure therein varies with the speed of rotation and is not a true and accurate measure of the torque being transmitted. It will be recognized that there is no fixed relationship between the speed of rotation of the shafts and the torque being transmitted.

It is therefore an object of this invention to provide a torque measuring apparatus capable of indicating true torque irrespective of the speed of rotation of the shafts.

It is a further object of this invention to provide a torque measuring and indicating apparatus for measuring the torque transmitted from one shaft to another without relying on axial movement of either shaft to produce an indication.

It is also an object of this invention to provide a torque indicator as set forth above wherein substantially no axial thrust is applied to the shafts themselves.

Another object of this invention resides in the provision of a torque indicator employing a hydraulic system wherein the hydraulic fluid is not subjected to centrifugal force.

It is still another object of this invention to provide a torque measuring and indicating device of simple construction yet economical to produce and of high sensitivity.

A still further object of this invention resides in the provision of a torque indicator wherein all rotating parts are of rugged construction and capable of a long useful life and wherein wear on the moving parts does not affect the accuracy of the indicated results.

Another object of this invention resides in the provision of the torque measuring and indicating features wherein all instrumentalities performing a measuring or indicating function are nonrotatably mounted on a fixed frame.

Figure 2:
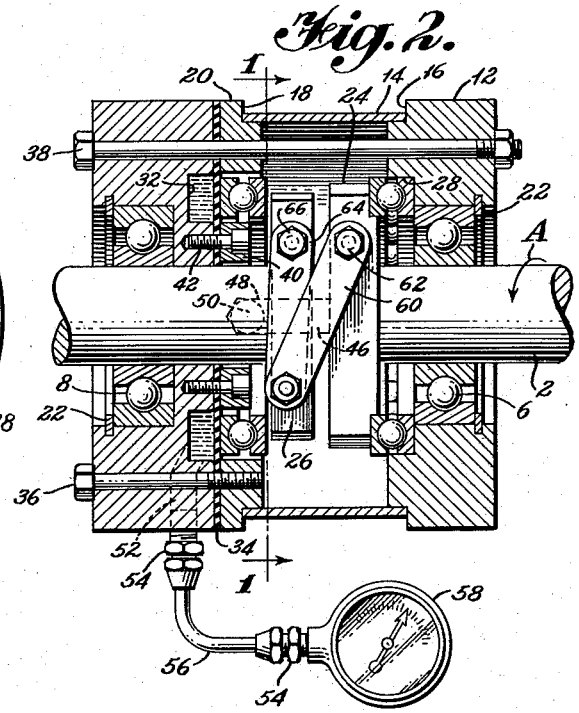
Figure 3:
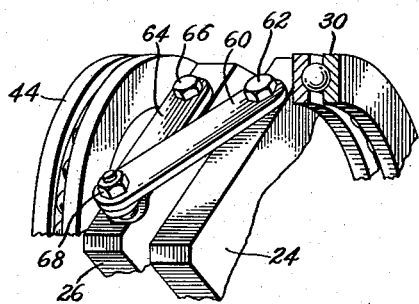
Figure 4:
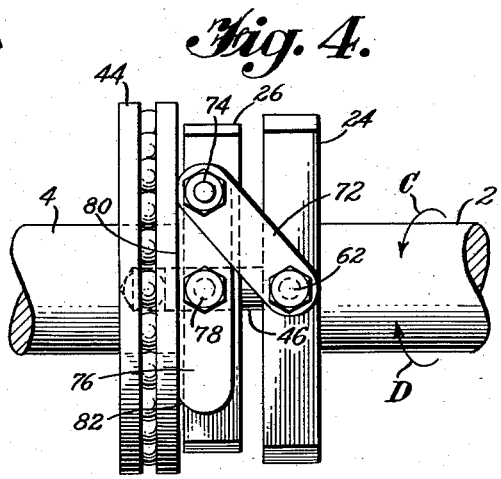
Figure 9:
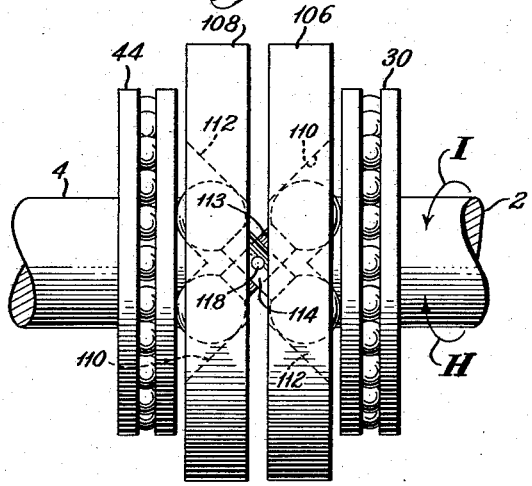
Figure 10:
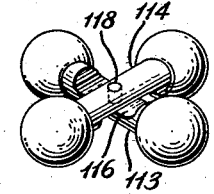
Figure 11:
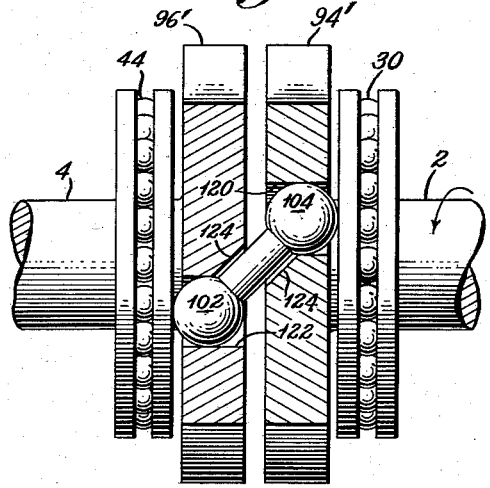
Figure 12:
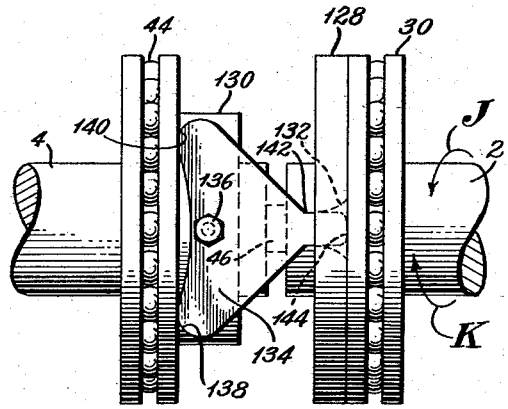

Still further objects and advantages will become apparent to those skilled in the art as the description proceeds in connection with the accompanying drawings wherein;

Fig. 1 is a transverse sectional view of an apparatus constructed in accordance with the present invention and taken substantially along the line 1—1 of Fig. 2, Fig. 2 is a longitudinal sectional view through the embodiment of Fig. 1 showing the entire apparatus of that embodiment, Fig. 3 is a fragmentary perspective view of certain of the elements of Fig. 2, Fig. 4 is a plan view of a modified form of torque transmitting means which may be employed with the frame and measuring means of Fig. 2, Fig. 5 is a plan view of a still further modified form of torque transmitting means capable of being employed with the frame and measuring means of Fig. 2, Fig. 6 is a fragmentary sectional view taken substantially along the line 6—6 of Fig. 5, Fig. 7 is a plan view of still another modification of elements usable in the Fig. 2 environment, Fig. 8 is a longitudinal sectional view taken substantially along the broken line 8—8 of Fig. 7, Fig. 9 is a view similar to Fig. 7 but showing a modified form of the Fig. 7 embodiment, Fig. 10 is a perspective view of the force transmitting elements of Fig. 9, Fig. 11 is a sectional view as taken substantially along the line 11—11 of Fig. 8 but showing a slight modification of the Fig. 8 embodiment, and Fig. 12 illustrates a still further modification of the means for transmitting torque from one shaft to another.

Referring first to Fig. 2, a pair of shafts, comprising; a driving shaft 2 and a driven shaft 4 are mounted by means of anti-friction bearings 6 and 8 in a stationary frame structure. The stationary frame structure comprises frame members 10 and 12 of generally annular shape and provided with bores adapted to snugly receive the anti-friction bearings 6 and 8 to rotatably mount shafts 2 and 4 in axial alignment with each other. A ring or casing member 14 fits in a rabbet 16 on frame member 12 and in a rabbet 18 in a clamping ring 20. The casing or ring member 14 functions to enclose the apparatus and to maintain adjacent ends of the shafts 2 and 4 in relatively axially fixed relationship. The inner races of the anti-friction bearings 6 and 8 may be press-fitted to the shafts 2 and 4 respectively and thus assist in preventing relative axial movement of the shafts. Preferably split retainer rings 22 are provided to maintain the bearings 6 and 8 in assembled relation to the frame members 10 and 12.

The adjacent ends of the shafts 2 and 4 are provided with flange members 24 and 26 respectively. The flange members 24 and 26 may be integral with their respective shafts or may be separately fabricated and rigidly mounted on the shafts as by welding or the like. In the particular embodiment illustrated in Figs. 1 to 3 the flanges 24 and 26 are of generally triangular shape, as readily apparent from Fig. 1.

The frame member 12 is provided with a counterbore 28 concentric to the bearing 6 and an anti-friction thrust bearing 30 is mounted therein. The outer race of the bearing 30 may be press-fitted into the counterbore 28 but need not be as long as it is maintained thereby in a position substantially concentric to the shaft 2. The inner race of bearing 30 bears against the flange 24 to absorb axial thrusts to the right (as seen in Fig. 2) and to prevent axial movement of shaft 2 to the right. As indicated in Fig. 2 the corner portions of the flange 24 may be cut away to provide a firm seat for the inner race of bearing 30.

The frame member 10 is formed with an annular recess 32 having its open side directed toward the flange 26. The annular recess 32 is covered by a flexible annular diaphragm 34 extending completely thereacross and across the end face of frame member 10. The clamping ring 20, previously referred to, overlies the outer marginal portion of the diaphragm 34 to clamp the diaphragm to the frame member 10 outwardly of the recess 32. Suitable cap screws 36 constitute means for clamping the ring 20 to the frame member 10. A circumferential series of cap screws 36 are, of course, employed and may be positioned in alternating relation to clamping bolts 38 extending through frame member 10, ring 20 and frame member 12 to hold the frame members and casing 14 in assembled relation.

The inner margin of the diaphragm 34 is clamped to the frame member 10 by means of an inner clamping ring 40 and suitable screws 42 extend through the clamping ring 40 into threaded engagement with frame member 10. It will thus be seen that the recess 32 and the diaphragm 34 define a completely enclosed expansible chamber positioned concentrically about the shaft 4.

The diaphragm 34 may be of any desired suitable material but is preferably constructed of a nylon fabric impregnated with neoprene. If desired, the fabric may be employed as internal reinforcement embedded in a sheet of neoprene or the like.

A second axial thrust bearing 44, similar to the bearing 30 is arranged concentrically about the shaft 4 with its inner race adjacent the outer face of flange 26 and its outer race abutting the diaphragm 34 in axial alignment with the recess 32. By the arrangement described it will be apparent that the flange 24 rotates with its shaft 2 while engaging the thrust bearing 30 and will cause the inner race of that bearing to rotate therewith. The outer races of the bearings 30 and 44 may be held stationary by friction alone without interfering with rotation of the shafts or flanges.

Preferably one of the shafts, for example shaft 2, is provided with an axial projection or reduced pilot 46 extending into a complementary bore 48 in the end of shaft 4. A suitable ball or other thrust bearing 50 may be positioned against the bottom of the bore 48 and in engagement with the end of the pilot 46. The pilot arrangement thus described constitutes means for preventing shafts 2 and 4 from moving axially toward each other without relying on the frictional resistance to such movement provided by the bearings 6 and 8.

A passageway 52 extends from the recess 32 to an outer surface of frame member 10. Suitable fittings 54 and a conduit 56 provide pressure communication between the chamber defined by recess 32 and a suitable pressure indicator 58. The pressure indicator 58 may be of any desired type but must include means therein to resist pressure applied thereto.

A force transmitting link 60 is pivoted as at 62 to a peripheral face of the flange 24 at a position outwardly of the mid point of that face and extends diagonally or obliquely across the space between the flanges 24 and 26 to a position where its other end overlies a peripheral face of the flange 26. Preferably the flange 24 is larger in radial dimensions than the flange 26 by such an amount that the peripheral faces of the flange 24 are radially outwardly of corresponding peripheral faces of the flange 26 by an amount substantially equal to the thickness of a second link 64 overlying a face of flange 26. The link 64 is pivoted to the peripheral face of flange 26 by suitable pivot means 66 and extends along said face to a position underlying the end of link 60. Suitable pivot means 68 pivotally join the link 60 to the link 64 as shown. The link 64 extends tangentially of the shaft 4 and its outer edge 70 adjacent pivot 68 may abut the face of the inner race of thrust bearing 44 although such contact is not necessary. The ends of link 60 are preferably rounded to define a surface concentric to the pivot adjacent each end of the link and of such radius that the concentric surfaces abut or bear against the inner races of bearings 30 and 44 respectively. Reference to Fig. 3 will show that the ends of link 60 abut the inner races of the thrust bearings described.

The above described structure constitutes one embodiment of the torque measuring and indicating apparatus of the present invention. The operation is as follows:

When torque A is applied to the shaft 2 in the direction indicated by arrow A, the shaft 2 will be caused to rotate. The torque applied to shaft 2 places link 60 under compression and transmits force in an oblique direction along the link 60 from the pivot 62 to the pivot 68. In other words, a force is transmitted from point 62 of shaft 2 to a point momentarily fixed relative to shaft 4 and having the same relation to shaft 4 as pivot 68, the latter point being axially and circumferentially spaced from point 62. The force transmitted along link 60 has a circumferential or tangential component and an axial component. By a simple force diagram applied to the point 68, it will be apparent that the force transmitted to the pivot 68 will have a tangential component extending longitudinally of link 64, and an axial component parallel to the axis of shaft 4. Clearly, the tangential component will be applied as torque to the shaft 4 and cause rotation thereof. The axial component of the force urges the link 64 to rotate in a clockwise direction about pivot 66 to move the pivot 68 to the left, as seen in Fig. 2. Since the end of link 60 bears against the inner race of thrust bearing 44, axial movement of pivot 68 to the left is restrained and results in the application of pressure to the thrust bearing 44. The thrust bearing 44 transmits the pressure to the diaphragm 34 and a suitable hydraulic liquid filling the recess 32 and extending into indicator 58. The usual indicator 58 is provided with spring or other means to resist the pressure and limit movement of the indicating end or pointer to a value indicative of the pressure in the recess 32. The actual axial movement of thrust bearing 44 is very small so that the angular relationship of links 60 and 64 remains substantially constant at all times. Since the angular relationship of the links remains substantially constant, the ratio of the axial component of force transmitted to the hydraulic liquid to the tangential force transmitted to shaft 4 also remains substantially constant, and thus the indicator 58 may be calibrated to directly indicate the torque being transmitted between the shafts. Any change in the magnitude of the torque is promptly reflected by a corresponding change in the value indicated at 58.

As previously stated, the flanges 24 and 26 are of generally triangular shape and the links 60 and 64 have been described in relation to a single peripheral face of each flange. Preferably each pair of corresponding faces is provided with links duplicating those shown in Fig. 2, as may be seen in Fig. 1. All but one pair of links has been omitted from Fig. 2 for clarity of illustration.

In the Fig. 2 embodiment, the mechanism is intended to operate as described while rotating only in the direction of arrow A.

It will be apparent that the hydraulic system by which the axial thrust, and therefore the torque, is measured is at all times stationary and not subjected to centrifugal force. If the hydraulic chamber defined by recess 32 were to rotate with the shafts, an increase in speed and the resulting increase in centrifugal force would increase the hydraulic pressure in the chamber and give an erroneous torque indication, even though the actual torque remained constant. Thus, the apparatus is capable of accurately measuring torque regardless of the speed of rotation of the shafts.

While the description thus far contemplates only a single annular recess 32 in frame member 10, it is clear that a similar recess and diaphragm may be provided in frame member 12 which would then be a duplicate of member 10. If a second hydraulic chamber were provided in frame member 12, the thrust bearing 30 would then be employed to abut the second diaphragm and a second passageway corresponding to the passageway 52 would be connected by a suitable conduit to the conduit 56, so that the sum of the pressures in the two chambers would be transmitted to the indicator 58 and proper calibration of the indicator employed with such an arrangement would clearly produce accurate indications of torque.

Applicant has heretofore specifically referred to the axial component of force existing at the pivot 68 but it will be obvious that an equal and opposite axial component exists at the pivot 62. The opposite component at pivot 62 would result in an axial thrust being transmitted to shaft 2 if it were not for the fact that the upper end of link 60 bears directly against the inner race of thrust bearing 30 and transmits that axial thrust directly to frame member 12.

Further embodiments of the invention will be described hereinafter but the description of each of the further embodiments will be limited to only those portions of the apparatus that are different. All subsequent descriptions of embodiments will be limited to modifications in the structure of the flanges at the ends of the shafts and the means for transmitting force from one flange to the other. It is to be understood, however, that each of those modifications are to be employed in a frame structure identical or similar to that described in connection with Fig. 2 and employing substantially the same means for detecting and indicating the thrust applied to thrust bearing 44. Throughout the embodiments to be described the shafts will be identified exactly as those shown in Fig. 2 and the thrust bearings will be identified by the same numerals employed in Fig. 2 since those thrust bearings are intended to occupy exactly the same positions and perform exactly the same functions.

Fig. 4 illustrates a modification of the embodiment of Fig. 2 and while it shows only the shafts 2 and 4, flanges 24 and 26 and thrust bearing 44, it is to be understood that these elements are to be assembled in the same frame structure as shown in Fig. 2 in the same relative positions and will operate in exactly the same manner. According to the embodiment of Fig. 4 a link 72 is pivoted, by a pivot pin 62, on flange 24 and extends obliquely to a position over the periphery of flange 26 laterally of the axis of shaft 4. The link 72 is pivoted at 74 to one end of a second link 76 which in turn is pivoted at 78 to the periphery of the flange 26 on an axis radial to shaft 4. The link 76 is pivoted to the flange 26 at a point intermediate the ends of the link and substantially midway therebetween so that link 76 extends approximately an equal distance on each side of its pivot in a direction tangent to the axis of shaft 4. The pivot 74 joining links 72 and 76 is spaced from the radial axis 78 a distance equal to the extent of the link 76 on the other side of its pivot. In this embodiment also the outer edge 80 of link 76 abuts the inner face of the inner race of the thrust bearing 44, although it is only necessary for the end portions of the link to contact the bearing race.

Assuming the Fig. 4 mechanism to be assembled in the frame of Fig. 2, it will be apparent that torque applied to shaft 2 in either direction will result in applying either compression or tension to the link 72 and transmit that force obliquely to the pivot 74. The link 76 will thus be urged to rotate about the axis of pivot 78 in either clockwise direction or counter-clockwise direction as seen in Fig. 4 (depending on whether torque is applied to shaft 2 in the direction of arrow C or arrow D). If tension is applied to link 72 the link 76 will be urged to rotate in a clockwise direction and its lowermost or free end 82 will be urged in an axial direction to the left. Since the end 82 bears against the inner race of thrust bearing 44 such clockwise rotation is resisted and the liquid in chamber 32 is placed under compression. Since the link 72 cannot rotate freely the net result is that an indication will be produced on indicator 58, proportional to the axial thrust and the tangential component of the tension in link 70 will be transmitted to shaft 4 as torque. If torque is applied to shaft 2 in the direction of arrow D the link 72 will be placed under compression and will try to rotate the link 76 in a counter-clockwise direction thus causing the end thereof at pivot 74 to move axially to the left a very slight amount and produce the described indication of torque. In this embodiment also the right hand end of link 72 bears against the inner race of thrust bearing 30 and prevents transmission of axial thrust to the shaft 2.

In both the embodiments of Figs. 2 and 4 a slight axial movement of the pivot end of the transmitting link is necessary to produce the required indication in indicator 58. To permit a slight axial movement of the left end of the transmitting link (60 or 72) it is necessary that the shafts 2 and 4 rotate relative to each other through a very small angle. Since the links are pivoted to a relatively flat surface defining the peripheries of flanges 24 and 26 it may be necessary that the pivots 62 and 66 of Fig. 2 or pivots 62 and 78 of Fig. 4 be slightly loose so that the links may accommodate themselves to the slight change in angular relation between the shafts. If desired, a ball and socket joint or the like providing for limited relative movement of the pivots 68 and 74 may be incorporated in the mechanism. As an alternative to loose pivots the links themselves may be slightly flexible to accommodate minute changes in angle between pivots 62 and 66 or 78. The shaft 2 of Fig. 4 is also provided with a reduced axial pilot 46, as described in connection with Fig. 2 and the pilot prevents approach of the flanges 24 and 26 toward each other when link 72 is in tension. It is intended that this modification, also, be provided with duplicate pairs of links on each pair of faces of the flanges 24 and 26.

Figs. 5 and 6 illustrate a still further modified form of apparatus for transmitting torque to shaft 4 while providing for axial movement of the transmitting member as a measure of the torque being transmitted. In this embodiment the same numerals are employed to identify the shafts and thrust bearings since they are identical to those described in connection with Fig. 2. The shaft 2 is provided with a flange 84 and shaft 4 is provided with a flange 86. The flange 86 has a cylindrical opening 88 extending therethrough in an axial direction but outward of the axis of shaft 4 so that the entire opening lies in the radially projecting portion of the flange as clearly illustrated in Fig. 6. The flange 84 is provided with a recess 90 having a concave inner surface facing the opening 88 and formed to define a portion of an axially curved ball race. A ball or sphere 92, of only slightly less diameter than the cylindrical opening 88, is positioned in that opening and the diameter of the ball and opening is such that the ball 92 extends axially into engagement with the concave surface of the recess 90 and completely through flange 86 into contact with the inner race of thrust bearing 44. The concave recess 90 may be termed a cam surface engageable with the periphery of the ball 92. It will be understood that the flange 86 and flange 84 are provided with a plurality of openings 88 and recesses 90, respectively, spaced uniformly about the shafts. Preferably three such arrangements are provided but more or fewer may be employed if desired. The outermost face of the flange 84 directly abuts the inner race of thrust bearing 30 which in turn is mounted rigidly in the stationary frame and thus provides reaction for the flange 84 to prevent its movement to the right. As shaft 2 is rotated in either direction, as indicated by the arrows E and F, the curved recess 90, constituting a cam surface tends to force the ball 92 to the left. Since the ball is in contact with thrust bearing 44 it cannot move to the left more than a very slight amount, that necessary to build up pressure in the liquid indicating system proportional to the magnitude of the thrust. It will be noted that the cam surface of recess 90 bears on the ball 92, during rotation, at a point laterally of the diameter of the ball which is parallel to the shafts and thus transmits an oblique force to the ball. The ball in turn bears against the sides of opening 88 and transmits a tangential force to the flange 86. The force thus transmitted from flange 84 to 86 is transmitted in an oblique direction and has both a tangential and an axial component. The tangential component applies torque to the shaft 4 whereas the axial component applies pressure to the thrust bearing 44 and hydraulic indicating system. It will be noted that in this form no axial thrust, other than that due to friction, is applied to the shaft 4 and all axial thrust applied to the flange 84 is absorbed by the thrust bearing 30. In this modification also the shafts are provided with the pilot 46 in recess 48 and thrust ball 50, the same as described in connection with Fig. 2, to insure constant spacing between the ends of shafts 2 and 4.

Figs. 7 and 8 illustrate a still further modification in which shaft 2 is provided with a flange 94 and shaft 4 is provided with a flange 96. The thrust bearings 30 and 44 are located closely adjacent the outermost faces of the flanges, the same as described in connection with the other modifications. Diagonal openings 98 and 100 extend obliquely through flanges 94 and 96, respectively. The openings 98 and 100 are cylindrical in right section and arranged with their axes aligned in an oblique direction, as clearly evident from Fig. 7. Preferably the flanges 94 and 96 are provided with three sets of aligned openings but only one will be described in detail since they are all identical and operate in the same way. A plurality is provided merely for the purpose of balancing the forces about the shaft axis. A force transmitting member 102 is provided at its ends with spherical portions 104 of approximately the same diameter as the openings 98 and 100. The overall dimensions of member 102 is such that the spherical ends 104 lie in the openings 98 and 100 with their outermost portions in surface contact with the inner races of bearings 30 and 44 (see Fig. 8).

When torque is applied to the shaft 2 in the direction indicated by arrow G of Fig. 7 a force is transmitted, through the walls of opening 98, to the spherical portion 104 in that opening. Due to the fact that the opposite end of member 102 bears against the flange on the driven shaft 4 and is restrained against axial movement outwardly of opening 100, the described force applied to the right-hand end of member 102 urges the member 102 to rotate about its left end in a clockwise direction as seen in Fig. 7. Since the thrust bearings 30 and 44 are a relatively fixed distance apart the member 102 cannot rotate so it will force the flange 96 to rotate in the same direction as flange 94 but will apply axial thrust to the bearings 30 and 44. The bearing 30 absorbs the thrust applied thereto while the bearing 44 transmits the axial thrust pressure to the hydraulic indicating system which in turn indicates the magnitude of that thrust as a measure of the torque being transmitted from shaft 2 to shaft 4.

Figs. 9 and 10 illustrate a still further embodiment. In this embodiment the flanges 106 and 108, on shafts 2 and 4, respectively, are each provided with pairs of openings 110 and 112 extending in opposite oblique directions. The openings 110 are aligned exactly as described in connection with Fig. 7 to define an oblique thrust line and the openings 112 are aligned in an oppositely oblique direction. The axes of the aligned openings preferably cross at a position between the flanges 106 and 108. The aligned openings 110 receive a thrust member 113 substantially identical to the member 102 described in connection with Fig. 7 and the openings 112 receive a similar thrust member 114. Since the thrust members 113 and 114 cross each other it is necessary that the reduced central portions thereof be offset radially of the shafts. Fig. 10 illustrates the assembly of thrust members 113 and 114. As shown in Fig. 10 the central portions of the thrust members may be flattened as at 116 and pivoted together by a pin 118. The dimensions of each thrust member 113 and 114 bear the same relationship to the flanges and thrust bearings as described in connection with Fig. 7 and by providing the crossed arrangement extending in oppositely oblique directions provision is thus made for transmitting torque in either direction as indicated by the arrows H and I. It will be apparent that the arrangement of Fig. 7 is capable of transmitting thrust in one direction only, that is the direction indicated by the arrow G. The arrangement shown in Figs. 9 and 10, however, is capable of transmitting torque in either direction. When torque is applied to shaft 2 in the direction of arrow H the transmitting member 114 is operative to transmit the described forces and member 113 merely "follows along" without transmitting thrust from one shaft to the other. When the shaft 2 is rotated in the direction of arrow I the member 113 becomes effective to receive forces from the flange 106 and transmit them to the flange 108 and thrust bearing 44 in the manner described. Preferably at least 3 such pairs of thrust members are provided, equally spaced about the shafts. Only one pair is shown to avoid confusion in the drawings.

Fig. 11 illustrates a somewhat modified arrangement substantially like that shown in Figs. 7 and 8 but with slight changes therein. Fig. 11 is a sectional view taken substantially along the line 11—11 of Fig. 8 but illustrating the modified construction. In this form flange 94' and flange 96' are provided with cylindrical openings 120 and 122, respectively, extending through the flanges in an axial direction. Each flange is further provided with a cut-away 124 extending obliquely toward the opening in the other flange which is normally positioned circumferentially spaced therefrom. In other words, the opening 120 in flange 94' is circumferentially spaced from the opening 122 in flange 96'. A force transmitting member 102 having spherical ends 104 is identical to the member 102 described in connection with Fig. 7. Referring briefly to Fig. 7 again it will be noted that the force transmitted from the flange 94 to the right hand ball end of member 102 is transmitted at the point of contact 126 between the surface of that ball end and a wall of the opening 98. Since force can be transmitted only normal to abutting surfaces it will be obvious that the force extends obliquely to the right through point 126 as shaft 2 is rotated in the direction of arrow G. This oblique force results in an axial thrust being applied to shaft 2 tending to move the shaft to the left and similar forces tend to move shaft 4 to the right. The pilot 46 and ball bearing 50 resist such tendency of shafts 2 and 4 to move toward each other but that axial thrust can be substantially eliminated by the arrangement shown in Fig. 11.

Since the openings 120 and 122 of Fig. 11 extend axially through flanges 94' and 96' and parallel to the shaft axes, it will be apparent that the thrusts applied by flange 94' to the ball 104 in opening 120 will be applied in a tangential direction and no other component, other than friction, is present to apply an axial thrust to shaft 2.

Fig. 12 illustrates still another embodiment of the invention. In this embodiment shaft 2 is provided with a rigid and relatively thin flange 128 and shaft 4 is provided with a relatively thick flange 130 of considerably less diameter than the flange 128. The flange 128 is provided with an axial opening 132 extending completely therethrough but flaring outwardly somewhat in a circumferential direction and toward its outer face. A force transmitting member 134 of generally triangular shape is pivoted to the periphery of flange 130 by suitable pivot means 136. The force transmitting member 134 extends circumferentially in both directions from the pivot 136 to curved lateral portions 138 and 140. Each of the portions 138 and 140 extend to and bear against the inner race of thrust bearing 44. The apex portion of the triangular transmitting member 134 extends axially to the right and an axial projection 142, integral therewith, extends into and through the opening 132 in flange 128. The projection 142 is of a lateral dimension only slightly smaller than the entrance edge of opening 132 and is curved at its end 144 to define a cylindrical surface concentric to the pivot pin 136. The curved end portion 144 bears against the inner race of thrust bearing 30 and is capable of rolling motion thereon, through a limited extent, as the shafts 2 and 4 rotate relative to each other in a slight amount. This modification is capable of transmitting and measuring torque applied to shaft 2 in either direction, as indicated by the arrows J and K.

As torque is applied to shaft 2 a side of opening 132 in flange 128 bears against and applies force to an edge of the projection 142 of member 134 and thus tends to cause member 134 to rotate about pivot pin 136. As member 134 is urged to rotate, in either direction, about pivot pin 136, one or the other of the lateral portions 138 or 140 will be urged in an axial direction against thrust bearing 44. Since the axial thrust applied to bearing 44 is resisted and limited by the hydraulic indicating system a very small rotation of member 134 about pivot 136 is permitted and torque will then be transmitted undiminished from shaft 2 to shaft 4. Since the projection 142 bears against the inner race of thrust bearing 30 substantially no axial thrust is applied to the shaft 2. An axial thrust will be applied to the shaft 4 through pivot pin 136 tending to move shaft 4 to the right. Such movement is restricted, however, by the reduced pilot 46 previously described and such axial torque will be transmitted through shaft 2 and flange 128 to thrust bearing 30 without causing actual axial movement of either shaft.

In the modifications described reference has been made to a hydraulic system employing a flexible diaphragm but clearly other apparatus may be employed, such as, an annular piston in recess 32 instead of the diaphragm 34. Furthermore, other known forms of force measuring means may be employed instead of the hydraulic system described, without departing from the principles of the invention. Also if desired, a recording mechanism may be employed in place of the visual indicator described.

While a limited number of specific embodiments have been shown and described, it is to be understood that the invention is not limited thereto, that other mechanisms may be employed within the spirit of this invention which is limited only by the scope of appended claims.

We claim:

1. A torque indicating device comprising, a driving shaft and a driven shaft, said shafts having adjacent inner ends rotatably mounted in a stationary frame in axial alignment, a transverse flange fixed to each shaft at its inner end, annular thrust bearings on said frame adjacent the outer faces of said flanges, an opening axially through one of said flanges, a recess in the other flange in axial alignment with said opening and having a cam surface therein, an element axially slidable in said opening and engaging one of said thrust bearings, said element also extending into said recess and engaging said cam surface, said cam surface being so arranged as to transmit force to said element in an oblique direction having an axial and a tangential component, means for measuring the axial force transmitted from said element to said one thrust bearing, the other of said thrust bearings engaging said other flange.

2. A device as defined in claim 1 wherein said opening is cylindrical and said element is a sphere of substantially the same diameter as said opening, said recess being provided with oppositely directed cam surfaces angularly spaced about the axis of said other flange and engageable with opposite sides of said sphere.

References Cited in the file of this patent

UNITED STATES PATENTS

| | | |
|---|---|---|
| 1,316,281 | Dalton | Sept. 16, 1919 |
| 2,089,604 | Hagy | Aug. 10, 1937 |

FOREIGN PATENTS

| | | |
|---|---|---|
| 725,171 | Germany | Sept. 16, 1942 |